H. L. HOLLIS & F. O. MELCHER.
BORING MACHINE.
APPLICATION FILED MAY 26, 1911.
1,047,411.  Patented Dec. 17, 1912.
2 SHEETS—SHEET 1.
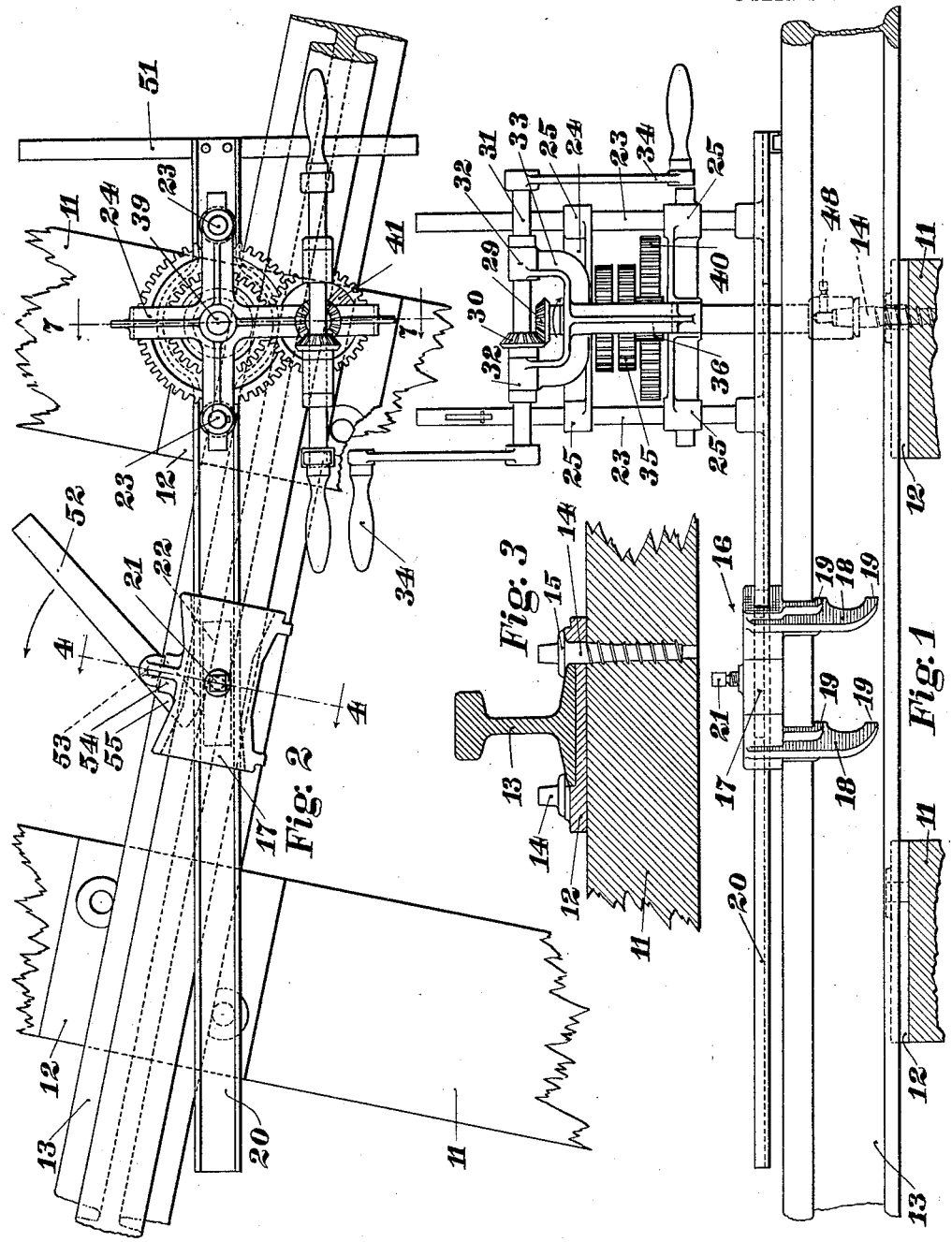
WITNESSES:
Albert G. McCaleb
Ernest W. Davis
INVENTORS:
HENRY L. HOLLIS
FRANK O. MELCHER
BY Brown Williams
ATTORNEYS H. L. HOLLIS & F. O. MELCHER
BORING MACHINE.
APPLICATION FILED MAY 26, 1911.
1,047,411.
Patented Dec. 17, 1912.
2 SHEETS—SHEET 2.
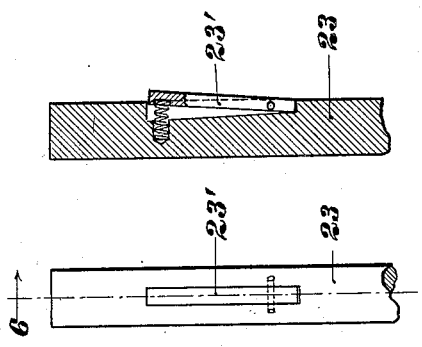
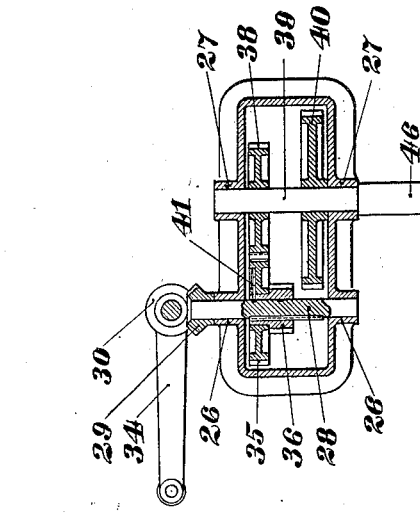
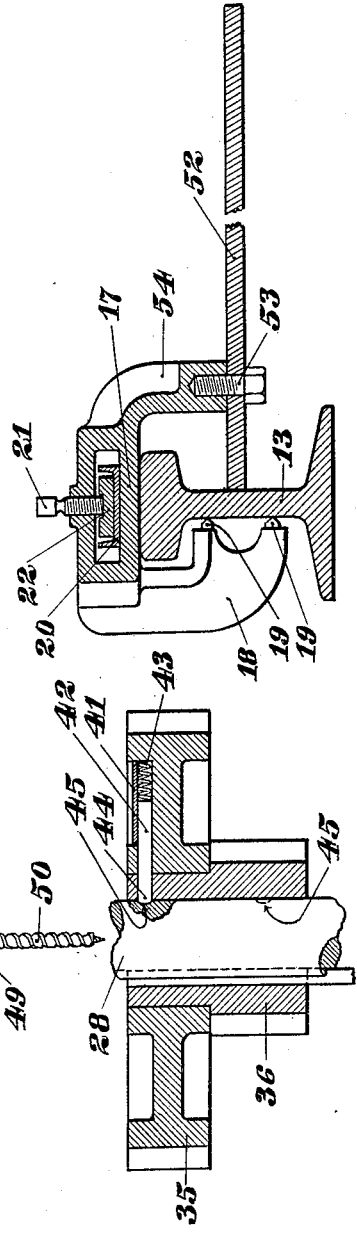
WITNESSES:
Ernest W. Davis
Albert G. McCaleb.
INVENTORS:
HENRY L. HOLLIS
FRANK O. MELCHER
BY Brown Williams
ATTORNEYS

UNITED STATES PATENT OFFICE.

HENRY L. HOLLIS AND FRANK O. MELCHER, OF WINNETKA, ILLINOIS.

BORING-MACHINE.

1,047,411.  Specification of Letters Patent.  Patented Dec. 17, 1912.

Application filed May 26, 1911. Serial No. 629,604.

*To all whom it may concern:*

Be it known that we, HENRY L. HOLLIS and FRANK O. MELCHER, citizens of the United States, residing at Winnetka, in the county of Cook and State of Illinois, have invented a certain new and useful Improvement in Boring-Machines, of which the following is a full, clear, concise, and exact description, reference being had to the accompanying drawings, forming a part of this specification.

Our invention relates to track tools and is intended to be used in track construction and repair.

Specifically, it is of greatest utility in connection with rails held to the ties by means of screw spikes or bolts as distinguished from the ordinary driven spike.

The tool of our invention can be used for various purposes, such as boring or drilling the holes for the reception of screw spikes, driving the screw spikes in the holes thus bored or withdrawing screw spikes in case of renewal or repair and in replacing an old screw spike with a new or larger spike. The peculiar utility of our track tool in conjunction with work of this character will more fully appear from the following explanation and from the subsequent detailed description of the tool of our invention.

It is essential in order to get the greatest benefit from the use of the screw spike that it be driven absolutely perpendicularly with respect to the base of the rail. The reason for this is as follows: The screw spike is provided near its upper end with a projecting flange, the under side of which is filleted to conform to the edge of the base of the rail. When the spike is driven close along side the base of the rail the filleted under side of the flange of the screw spike engages the upper edge of the base of the rail. The tie plate sometimes used in a construction of this kind is ordinarily provided with a boss of a height corresponding with the thickness of the base of the rail, the boss being located just under the side of the flange of the screw spike opposite the point at which the rail is engaged by that flange. It is the purpose and aim that the flange of the screw spike shall bear equally upon the upper side of the base of the rail and upon this boss forming a part of the tie plate. If the spike is not driven with exact perpendicularity relative to the base of the rail the flange of the screw spike will be cocked up on one side or the other, thus preventing it from securing the required bearing upon the base of the rail and the boss of the tie plate.

It is the general object of our invention to provide improvements in a track tool for handling the driving of screw spikes in railroad construction or maintenance, which improvements will insure the proper placement of the screw spikes and which at the same time will enable this work to be handled expeditiously and well with the help of unskilled laborers.

It is the purpose of this invention to make the track tool easily portable and to adapt itself readily either to bore or drill the holes into which the screw spikes are to be driven, also to drive the screw spikes in the holes thus drilled or to withdraw them when occasion may require.

Withal our invention provides a simple and inexpensive tool.

The several objects of our invention are attained partly by the use of the rail or rails themselves for determining the alinement of the boring and screw driving mechanism. The invention of the present application depends upon a single rail for determining its alinement. A clamping member is provided with extensions carrying feet adapted to engage the web of the rail at points vertically displaced in such a way that the alinement of the clamping member is absolutely determined by the engagement of the feet upon the web of the rail. We provide means for quickly and easily gripping the clamping member in fixed position upon the rail. A drilling mechanism or a screw-driving mechanism or a combined drilling and screw-driving mechanism is mounted to slide up and down upon a frame or bracket carried by an arm having a combined longitudinal and rotative motion relative to the clamping member with which the arm is connected. The connection of the arm with the clamp is such that the arm with the drilling or driving mechanism at its end may be swung to this side or to that side of the rail and such also that the drilling or driving mechanism may be moved nearer to or farther away from the clamp as the occasion may demand. Throughout any such movement of the drilling or driving mechanism, however, the perpendicularity of the guiding frame and hence of the drilling or driving mechanism is rigidly maintained by the nature of the connection between the swinging and sliding arm and the clamp which engages the web of the rail. As it is practically necessary that the guiding frame be held fixedly in position during the drilling or driving operation, it is almost impossible for workmen to utilize the tool at all without using the clamp, which when used insures the exact perpendicularity of the drilling or driving spindle with respect to the base of the rail.

It has been found to be good practice to place so-called "tie plates" upon the wooden ties and to dispose the rails upon these tie plates. These tie plates are previously drilled in accordance with standard requirements and, after the rails have been disposed in place thereon, they form guiding means for determining the position of the auger during the drilling operation. Thus, when the boring is to be done in this instance, the supporting framework may be clamped upon the rail or rails, as will be described, and the vertical position of the auger spindle is at once determined. The arrangement is such as to admit of the movement of the entire drill press in a horizontal plane, and this arrangement permits of the adjustment of the mechanism so that the auger can be guided into the holes of the tie plates. It will appear, of course, that our invention may be employed whether or not such tie plates are used, the position of the auger spindle in the latter case being determined in any other suitable manner.

It will be evident to those skilled in the art that our machine may be employed not only to bore the holes in the ties, but may also be used to drive the screw spikes into place, after the boring operation, and to remove them when desirable. It is preferable to drive the press spindle at a comparatively high rate of speed during the boring operation and to drive it at a comparatively low rate of speed when the spike is being driven, in order that the necessarily greater power may be secured. To this end we provide a novel gear arrangement which permits of the ready and convenient shifting from one ratio to another. We contemplate also the use of two machines, built along precisely the same lines except as to the gear ratios. In such a case, one of the machines is so constructed that the spindle is driven at a high rate of speed and is adapted to receive and drive an auger bit. The other machine is so constructed that the spindle is driven at a comparatively low rate of speed, with a consequent increase in the power available to turn or drive a screw spike. In this case the spindle is adapted for the reception of the polygonal head of the screw spike.

Other novel features of construction and arrangement will be explained as this description proceeds and they will be made the subject-matter of the more specific of the claims appended.

My invention is illustrated in the accompanying drawings, in which,

Figure 1 is a side elevational view of the device showing its application to one of the rails; Fig. 2 is a plan view thereof; Fig. 3 is a cross-sectional view of the rail and tie showing the use of the tie plate referred to; Fig. 4 is a cross sectional view taken on the plane of the line 4—4 of Fig. 2 and looking in the direction indicated by the arrows; Fig. 5 is a detail view of the supporting mechanism; Fig. 6 is a longitudinal sectional view taken on the plane of the line 6—6 of Fig. 5 and looking in the direction indicated by the arrows; Fig. 7 is a sectional view taken on the plane of the line 7—7 of Fig. 2 and looking in the direction indicated by the arrows; and Fig. 8 is a sectional view, being a detail of the gear shifting mechanism.

Like reference characters are applied to the same parts throughout the various figures.

Referring first to the form of my device shown in Figs. 1 and 2, it will be seen that ties are illustrated at 11, 11, tie plates 12, 12 being disposed thereon and the rail 13 resting on these tie plates. The finished arrangement for securing the rail to the tie is illustrated in Fig. 3, this feature being emphasized to bring out the importance of the result secured by our invention. It will be noted that the screw spike 14 is provided with a flange 15 which rests simultaneously upon the flange of the rail and upon a bolster portion of the tie plate. If this relation of parts is to exist it is necessary that the axis of the screw spike, when in place, be at right angles to the base of the rail, and our invention, as before pointed out, provides for this result.

The supporting arrangement for the drill press comprises, first of all, a clamp 16 which has a body portion 17 and two downward extensions 18, 18 having feet 19, 19, the positions of which are carefully predetermined. These engaging parts are adapted to contact with the web of the rail, as illustrated in Fig. 4, so that the clamp 16, as a whole, will occupy a certain definite position. The body 17 rests directly on the top of the rail and the contact points are held in firm engagement with the web by a jam mechanism which is operated quickly and simply, the specific form of which will be described later. The body 17 of the clamp is provided with a longitudinal passageway in which a channel iron 20 is disposed, as best illustrated in Fig. 4. A set screw 21, threaded in the body, engages with a contact block 22 disposed in the channel, and in this way the channel iron is held in any adjusted position. At one end thereof, the channel is provided with two upright standards 23, 23 and the drill press frame 24, in the form of a skeleton, is mounted to move vertically upon this standard. The skeleton frame 24 is provided with the barrels 25, 25 which embrace the standards 23, 23, and with bearings 26, 26 and 27, 27, the purpose of which will be pointed out presently. A shaft 28 is mounted in the bearings 26, 26 and a beveled pinion 29 is secured upon the upper end of this shaft beyond the bearing. This pinion 29 meshes with a beveled gear 30 secured upon a driving shaft 31 journaled in bearings 32, 32 which are carried by extensions 33, 33 from the skeleton frame 24. The driving shaft 31 is provided with a crank 34 at each end, and these cranks are thus so disposed that they may be simultaneously operated by a workman.

A duplex gear piece, comprising the pinions 35 and 36 is slidably mounted upon the shaft 28 and is held against rotation relative thereto by means of the feather 37. The pinion 35 is adapted to mesh with a spur gear 38 which is secured upon a shaft 39 mounted in the bearings 27, 27 and the pinion 36 is adapted to mesh with the spur gear 40 securely mounted on this shaft. The duplex gear piece is slidable upon the shaft 28 so that either the gears 35 and 38 or the gears 36 and 40 may be in mesh. When the former condition exists the shaft 39 is adapted to be driven at a high rate of speed and when the latter condition exists it is adapted to be driven at a low rate of speed. The means for holding the duplex gear piece in either of its alternative positions is shown in Fig. 8. The pinion 35 is provided with a pocket 41 in which a plunger 42 is confined against the tension of a small coiled spring 43. This plunger has a rounded end 44 which is adapted to engage in a correspondingly shaped depression 45 in the shaft 28. There are two such depressions 45, one for use with either of the foregoing combinations. The two depressions are of course in line so that the presence of the feather will always guide the plunger into one or the other of them. Since the end of the plunger is rounded and since the depressions are shallow the duplex gear piece can be readily shifted from one to the other without any special release. It is forced out of one position and into the other and it will remain in either state with sufficient rigidity to secure proper operation.

The shaft 39 is extended to form the spindle 46 which is provided with a socket at its end. Where one machine is used for the purposes of both boring and driving, this socket is compound so that it may receive the shank of an auger bit in a bore 47, the bit being held in place by a set screw 48, or may receive the head of a spike in a pocket 49. When two machines are used, as before pointed out, the spindle may be provided with means for accommodating only the auger, or only the spike, as the case may be. In Fig. 1 we have illustrated a spike 14 in the socket and in Fig. 7 we have illustrated an auger 15 therein, the proper gear relation being shown in each case.

It will be noted that all the parts which have been described are positively related to each other in such a way that the axis of the driving spindle is parallel to the travel of the drill press frame and parallel with the plane of the engaging points on the clamp 16. Thus the line of the spindle will always be in a definite position relative to the plane of the engaging points and these engaging points are so predetermined that the axis of the spindle will be at right angles to the base of the rails. As an auxiliary support the front end of the channel 20 is provided with a cross piece 51 which is adapted to engage the top of the rail as illustrated in Figs. 1 and 2. The passageway through the body of the clamp 16 is flared at both ends, as illustrated in Fig. 2, so that the shaft 39 may occupy a position on either side of the rail. As before stated, the set screw 21 may clamp the channel iron in any position, and it will thus appear that the drill press can be moved toward and away from the clamp 16 as well as from one side of the rail to the other. Thus, if a fish plate or bonding arrangement should occur near the point at which it is desired to drill, the clamp 16 may be moved to one side or the other thereof and the channel iron 20 may be adjusted to compensate for the difference in position so that the shaft 39 may, nevertheless, occupy the proper position. The clamp 16 may be held in place in any suitable manner but we prefer the clamping handle 52, best shown in Figs. 2 and 4. This clamping handle is pivoted at 53 to an extension 54 from the body of the clamp, and the end 55 of the handle is adapted to engage the web of the rail, opposite the engaging points 19, 19, so as to securely clamp the entire arrangement in place. This arrangement is valuable since it permits of the very quick removal of the entire structure from the rail, which is desirable because of the possibility of an approaching train.

In order that the drill press may be held in its raised position while being shifted from place to place, we provide a spring latch 23′ in one or more of the standards, this spring latch being shown in detail in Figs. 5 and 6. When the frame 24 is lifted high enough the latch 23′ will snap into place to support the entire arrangement. When it is desired to lower it, the latch 23′ is pressed into the slot in which it is pivoted, so as to allow the frame to drop.

Having described the structure of our invention in detail, it will be apparent that it provides a more or less universal track tool, which is of light weight and readily portable. It may be applied to bore holes or drive or withdraw screw spikes in almost any possible position and no matter what may be the required position of the holes to be bored or the spikes to be driven the tool provides a means whereby the most ignorant workman can scarcely fail to attain the required perpendicularity. The swinging connection between the supporting arm and the clamp make it possible to shift the work spindle to either side of the track as may be required, while the longitudinal movement which the arm may have relative to the clamp enables the work to be done wherever required, while at the same time the clamp may be shifted to a place where there is no fish plate or bonding device or other obstruction to interfere with the engagement of the feet of the clamp upon the web of the rail. Although both the ability to swing the drilling or driving mechanism relative to the clamp and the ability to adjust the supporting bar longitudinally with respect to the clamp would have a certain degree of utility without the presence of the other, the combination makes a tool which is far more adaptable to varying conditions, such as are likely to be met in track building or maintenance.

We claim as new and desire to secure by Letters Patent:

1. In a railroad track tool, a clamp having rigidly associated therewith a plurality of engaging feet adapted to make contact with the same side of the web of a rail and to thus determine the alinement of the clamp with respect to the rail, a supporting bar adjustably carried by said clamp, and a work spindle carried by said supporting bar in a line parallel with the plane of the engaging feet of said clamp.

2. In a railroad track tool, a clamp comprising a body portion having a plurality of relatively rigid engaging feet adapted to make contact with the same side of the web of the rail to thus determine the alinement of the clamp with respect to the rail, said body having a passageway therethrough which flares outwardly in both directions, a supporting bar extending through said passageway, a set screw for holding said supporting bar in position, and a work spindle carried by said supporting bar so that its axis will be parallel with the plane of said engaging feet.

3. In a railroad track tool, a clamp having rigidly associated therewith a plurality of engaging feet adapted to make contact with the same side of the web of a rail to thus determine the alinement of the clamp with respect to the rail, a supporting bar carried by said clamp, said bar being movable into two operative positions, one on one side of the rail and the other on the other side of the rail, and a work spindle carried by said supporting bar in a line parallel with the plane of said engaging feet.

4. In a track tool for boring holes and driving screw spikes in railroad ties, a clamp having rigidly associated therewith a plurality of engaging feet adapted to make contact with the same side of the web of a rail to thus determine the alinement of the clamp with respect to the rail, a supporting bar carried by said clamp and being movable into two operative positions on lines intersecting the plane of said engaging feet, means for securing said bar in either of said positions, and a work spindle carried by said bar in a line parallel with the plane of the engaging feet of said clamp.

5. In a railroad track tool, a clamp having rigidly associated therewith a plurality of engaging feet adapted to make contact with the same side of the web of a rail to thus determine the alinement of the clamp with respect to the rail, a supporting bar carried by said clamp, said bar being longitudinally adjustable and being capable of being swung into two operative positions, one toward one side of the rail and the other toward the other side of the rail, and a work spindle carried by said supporting bar in a line parallel with the plane of said engaging feet.

6. In a railroad track tool for boring holes and driving screw spikes in railroad ties, a clamp having a plurality of relatively rigid engaging feet adapted to make contact with the same side of the web of a rail, a supporting bar carried by said clamp and confined to movement in a plane at right angles to the plane of said engaging feet, and a work spindle carried by said supporting bar and having its axis at right angles to said plane in which said bar is movable, and jamming means engaging the other side of the web of the rail for securing said bar in any desired position.

7. In a track tool, a clamp having a body adapted to rest upon the top of the rail, feet extending from and rigid with said body and adapted to contact with the same side of the web of the rail, said body having a passageway therethrough, a supporting bar extending through said passageway and being adjustable therein, a set screw for holding said supporting bar in position, a work spindle carried by said bar, and a clamping handle pivoted on another extension from said body, said clamping handle being adapted to engage the web of the rail opposite the contacting points of said feet.

8. In a railroad track tool, a clamp formed to rest upon the ball of a rail and having rigidly associated therewith a plurality of engaging feet adapted to make contact with the same side of the web of the rail and to thus determine the alinement of the clamp with respect to the rail by means of the rail alone, a supporting bar adjustably carried by said clamp being capable of being mounted to intersect the rail, a work spindle carried by said supporting bar, and a transverse bar secured to said supporting bar to form a T and adapted to rest on the rail.

9. In a railroad track tool, a clamp having rigidly associated therewith a plurality of engaging feet adapted to make contact with the same side of the web of a rail and to thus determine the position of the clamp with respect to the rail, a supporting bar carried by said clamp, and a work spindle carried by said supporting bar in a line parallel with the plane of the engaging feet of said clamp.

In witness whereof, we hereunto subscribe our names, this 22nd day of May, 1911.

HENRY L. HOLLIS.
FRANK O. MELCHER.

Witnesses:
HARVEY L. HANSON,
ALBERT G. MC. CALEB.

---

Copies of this patent may be obtained for five cents each, by addressing the "Commissioner of Patents, Washington, D. C."

---